(12) United States Patent
Gao et al.

(10) Patent No.: US 9,104,733 B2
(45) Date of Patent: Aug. 11, 2015

(54) WEB SEARCH RANKING

(71) Applicant: Microsoft Corporation, Redmond, WA (US)

(72) Inventors: Jianfeng Gao, Woodinville, WA (US); Zhonghua Qu, Dallas, TX (US); Gu Xu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 13/688,209

(22) Filed: Nov. 29, 2012

(65) Prior Publication Data

US 2014/0149429 A1  May 29, 2014

(51) Int. Cl.
*G06F 17/30* (2006.01)

(52) U.S. Cl.
CPC ...... *G06F 17/3053* (2013.01); *G06F 17/30702* (2013.01); *G06F 17/30864* (2013.01)

(58) Field of Classification Search
CPC .................. G06F 17/30675; G06F 17/30864; G06F 17/30867
USPC ................. 707/706, 748, 749, 798, 759, 734; 706/15, 12, 45
See application file for complete search history.

(56) References Cited

U.S. PATENT DOCUMENTS

| | | | |
|---|---|---|---|
| 7,734,633 B2 * | 6/2010 | Liu et al. | 707/749 |
| 7,788,276 B2 | 8/2010 | Peng et al. | |
| 7,844,555 B2 * | 11/2010 | Gao et al. | 706/15 |
| 8,051,061 B2 * | 11/2011 | Niu et al. | 707/706 |
| 8,392,343 B2 * | 3/2013 | Cetin et al. | 706/12 |
| 8,407,041 B2 * | 3/2013 | Deng et al. | 704/2 |
| 8,682,811 B2 * | 3/2014 | Burges et al. | 706/12 |
| 8,798,984 B2 * | 8/2014 | Cancedda et al. | 704/2 |
| 2006/0074630 A1 * | 4/2006 | Chelba et al. | 704/9 |
| 2008/0208836 A1 * | 8/2008 | Zheng et al. | 707/5 |
| 2008/0319736 A1 | 12/2008 | Toutanova et al. | |
| 2009/0106173 A1 | 4/2009 | Andrew et al. | |
| 2009/0125501 A1 * | 5/2009 | Gao et al. | 707/5 |
| 2009/0248422 A1 * | 10/2009 | Li et al. | 704/277 |
| 2009/0313286 A1 | 12/2009 | Mishra et al. | |
| 2010/0082511 A1 * | 4/2010 | Niu et al. | 706/21 |
| 2010/0125570 A1 * | 5/2010 | Chapelle et al. | 707/722 |
| 2010/0153315 A1 * | 6/2010 | Gao et al. | 706/12 |
| 2010/0161596 A1 | 6/2010 | Yan et al. | |

(Continued)

OTHER PUBLICATIONS

Dupret, et al., "A Model to Estimate Intrinsic Document Relevance from the Clickthrough Logs of a Web Search Engine", Retrieved at <<http://wume.cse.lehigh.edu/~ovd209/wsdm/proceedings/docs/p181.pdf>>, Third ACM International Conference on Web Search and Data Mining, Feb. 4, 2010, pp. 10.

(Continued)

*Primary Examiner* — Jean M Corrielus

(74) *Attorney, Agent, or Firm* — Steve Wight; Doug Barker; Micky Minhas

(57) ABSTRACT

A computer-implemented method and system for Web search ranking are provided herein. The method includes generating a number of training samples from clickthrough data, wherein the training samples include positive query-document pairs and negative query-document pairs. The method also includes discriminatively training a translation model based on the training samples and ranking a number of documents for a Web search based on the translation model.

14 Claims, 4 Drawing Sheets

(56) References Cited

U.S. PATENT DOCUMENTS

| | | | |
|---|---|---|---|
| 2010/0161642 | A1 | 6/2010 | Chen et al. |
| 2010/0299350 | A1 | 11/2010 | Konig et al. |
| 2010/0318531 | A1* | 12/2010 | Gao et al. ............... 707/759 |
| 2011/0029517 | A1* | 2/2011 | Ji et al. ............... 707/734 |
| 2011/0225042 | A1 | 9/2011 | Cetin |
| 2012/0023043 | A1* | 1/2012 | Cetin et al. ............... 706/12 |
| 2012/0096042 | A1* | 4/2012 | Brockett et al. ............... 707/798 |
| 2012/0109860 | A1* | 5/2012 | Xu et al. ............... 706/12 |
| 2012/0143789 | A1 | 6/2012 | Wang et al. |
| 2012/0158621 | A1* | 6/2012 | Bennett et al. ............... 706/12 |
| 2013/0103493 | A1* | 4/2013 | Gao et al. ............... 705/14.46 |
| 2013/0159320 | A1* | 6/2013 | Gao et al. ............... 707/748 |

OTHER PUBLICATIONS

Karimzadehgan, et al., "Estimation of Statistical Translation Models Based on Mutual Information for Ad Hoc Information Retrieval", Retrieved at <<http://sifaka.cs.uiuc.edu/czhai/pub/sigir10-tm.pdf>>, 33rd International ACM SIGIR Conference on Research and development in Information Retrieval, Jul. 19, 2010, pp. 8.

Jagarlamudi, et al., "Modeling Click-through based Word-pairs for Web Search", Retrieved at <<http://www.umiacs.umd.edu/~jags/pdfs/jags12PairModel.pdf>>, WWW 2012 Companion, Apr. 16, 2012, pp. 2.

Och, et al., "Discriminative Training and Maximum Entropy Models for Statistical Machine Translation", Retrieved at <<http://acl.ldc.upenn.edu/acl2002/MAIN/pdfs/Main074.pdf>>, In Proceedings of the 40th Annual Meeting on Association for Computational Linguistics, Jul. 6, 2002, pp. 8.

Song, et al., "A General Language Model for Information Retrieval", Retrieved at <<http://www.bradblock.com/A_General_Language_Model_for_Information_Retrieval.pdf>>, In Proceedings of the Eighth International Conference on Information and Knowledge Management, Nov. 2, 1999, pp. 6.

Gao, et al., "Clickthrough-Based Translation Models for Web Search: from Word Models to Phrase Models", Retrieved at <<http://research.microsoft.com/en-us/um/people/jfgao/paper/cikm1108-gao.pdf>>, In Proceedings of the 19th ACM International Conference on Information and Knowledge Management, Oct. 26, 2010, pp. 10.

Gao, et al., "Towards Concept-Based Translation Models Using Search Logs for Query Expansion", Retrieved at <<http://research.microsoft.com/en-us/um/people/jfgao/paper/2012-papers/fp104-gao.pdf>>, In 21st ACM International Conference on Information and Knowledge Management, Oct. 29, 2012, pp. 10.

Andrew, et al., "Scalable Training of L1-Regularized Log-Linear Models", Retrieved at <<http://www.machinelearning.org/proceedings/icml2007/papers/449.pdf>>, In Proceedings of the 24th international Conference on Machine learning, Jun. 20, 2007, pp. 8.

Berger, et al., "Information Retrieval as Statistical Translation", Retrieved at <<http://www.informedia.cs.cmu.edu/documents/irast-final.pdf>>, In Proceedings of the 22nd Annual International ACM SIGIR Conference on Research and Development in Information Retrieval, Aug. 15, 1999, pp. 8.

Brown, et al., "The Mathematics of Statistical Machine Translation: Parameter Estimation", Retrieved at <<http://acl.ldc.upenn.edu/J/J93/J93-2003.pdf>>, In Journal of Computational Linguistics—Special Issue on Using Large Corpora, Jun. 1993, pp. 50.

Lease, Matthew, "An Improved Markov Random Field Model for Supporting Verbose Queries", Retrieved at <<http://www.ischool.utexas.edu/~ml/papers/lease-sigir09.pdf>>, In Proceedings of the 32nd International ACM SIGIR Conference on Research and Development in Information Retrieval, Jul. 19, 2009, pp. 8.

Och, et al., "A Smorgasbord of Features for Statistical Machine Translation", Retrieved at <<http://acl.ldc.upenn.edu/N/N04/N04-1021.pdf>>, In Human Language Technology Conference / North American Chapter of the Association for Computational Linguistics Annual Meeting, May 2, 2004, pp. 8.

Gao, et al., "A Comparative Study of Parameter Estimation Methods for Statistical Natural Language Processing", Retrieved at <<http://acl.ldc.upenn.edu/P/P07/P07-1104.pdf>>, In Proceedings of the 45th Annual Meeting of the Association of Computational Linguistics, Jun. 23, 2007, pp. 8.

Nallapati, Ramesh., "Discriminative Models for Information Retrieval", Retrieved at <<http://www.inf.ed.ac.uk/teaching/courses/tts/papers/nallapati04.pdf>>, In Proceedings of the 27th Annual International ACM SIGIR Conference on Research and Development in Information Retrieval, Jul. 25, 2004, pp. 8.

Craswell, et al., "An Experimental Comparison of Click Position-Bias Models", Retrieved at <<http://citeseerx.ist.psu.edu/viewdoc/download?doi=10.1.1.112.1288&rep=rep1&type=pdf>>, In Proceedings of the International Conference on Web Search and Web Data Mining, Feb. 11, 2008, pp. 8.

Srikanth, et al., "Biterm Language Models for Document Retrieval", Retrieved at <<http://www.cedar.buffalo.edu/papers/articles/SIGIR02_biterm.pdf>>, In Proceedings of the 25th Annual International ACM SIGIR Conference on Research and Development in Information Retrieval, Aug. 11, 2002, pp. 2.

Chapelle, et al., "A Dynamic Bayesian Network Click Model for Web Search Ranking", Retrieved at <<http://www2009.org/proceedings/pdf/p1.pdf>>, In Proceedings of the 18th International Conference on World Wide Web, Apr. 20, 2009, pp. 10.

"Clickthrough-Based Latent Semantic Model", U.S. Appl. No. 13/329,345, filed Dec. 19, 2011, pp. 29.

"International Search Report & Written Opinion for PCT Application No. PCT/US2013/072502", Mailed Date: May 28, 2014, Filed Date: Nov. 29, 2013, 12 Pages.

Carter, et al., "Syntactic Discriminative Language Model Rerankers for Statistical Machine Translation", In Journal of Machine Translation, vol. 25, Issue 4, Sep. 1, 2011, pp. 317-339.

Joachims, Thorsten, "Optimizing Search Engines Using Clickthrough Data", In Proceedings of the Eighth ACM SIGKDD International Conference on Knowledge Discovery and Data Mining, Jan. 1, 2002, pp. 133-142.

* cited by examiner

100

300

400

WEB SEARCH RANKING

BACKGROUND

Many modern search engines retrieve Web documents by literally matching terms in the Web documents with those in a search query using lexical matching methods. However, such lexical matching methods can be inaccurate due to language discrepancies between Web documents and search queries. For example, language discrepancies often occur because concepts are expressed using different vocabularies and language styles in Web documents versus search queries. Therefore, in many cases, the retrieval of appropriate Web documents relating to a particular search query may be difficult due to such language discrepancies.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a system and method for Web search ranking using a discriminatively trained translation model. An embodiment provides a computer-implemented method for Web search ranking. The method includes generating a number of training samples from clickthrough data, wherein the training samples include positive query-document pairs and negative query-document pairs. The method also includes discriminatively training a translation model based on the training samples and ranking a number of documents for a Web search based on the translation model.

Another embodiment provides a system for Web search ranking. The system includes a processor that is adapted to execute stored instructions and a system memory. The system memory includes code configured to generate a number of training samples from clickthrough data, wherein position bias within the clickthrough data is removed during generation of the training samples. The system memory also includes code configured to discriminatively train a sparse log-linear translation model based on the training samples and rank a number of documents for a Web search based on the sparse log-linear translation model.

In addition, another embodiment provides one or more computer-readable storage media for storing computer-readable instructions. The computer-readable instructions provide a Web search ranking system when executed by one or more processing devices. The computer-readable instructions include code configured to generate a number of training samples from clickthrough data, wherein the training samples include positive query-document pairs and negative query-document pairs, and wherein position bias within the clickthrough data is removed during generation of the training samples. The computer-readable instructions also include code configured to discriminatively train a translation model based on the training samples and rank a number of documents for a Web search based on the translation model.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Query-based Web search engines are useful online services. The value of such search engines may be measured by their ability to rank relevant documents higher in a search result list for a particular query than irrelevant documents. However, lexical gaps often exist between queries and documents corresponding to the queries. The term "lexical gap" refers to word mismatching between the query and the corresponding documents. Such lexical gaps may be caused by the presence of synonyms, typos, or words that are different but semantically related. Furthermore, in many cases, such lexical gaps result in difficulties in determining the relevance of documents to a corresponding query.

Thus, embodiments described herein are directed to the mitigation of the effects of such lexical gaps with respect to Web search ranking techniques. This may be accomplished by using textual information within documents for a Web search to rank the documents based on their relevance to a query corresponding to the Web search. More specifically, documents for a Web search corresponding to a particular query may be ranked using a translation model that has been trained based on textual similarities between the documents and the query. In various embodiments, the translation model utilized herein is a sparse log-linear model that is trained using an L1-norm regularization algorithm, such as the Orthant-Wise Limited-memory Quasi-Newton (OWL-QN) algorithm, as discussed further below.

Figure 1:
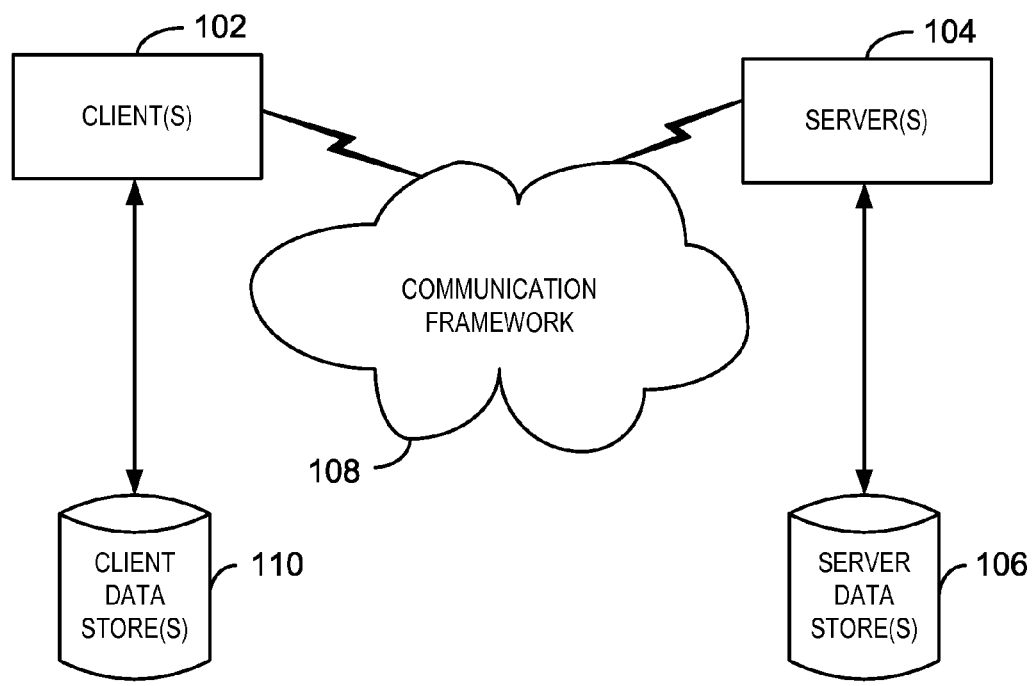
FIG. 1 is a block diagram of a networking environment in which a system and method for Web search ranking may be implemented.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 2:
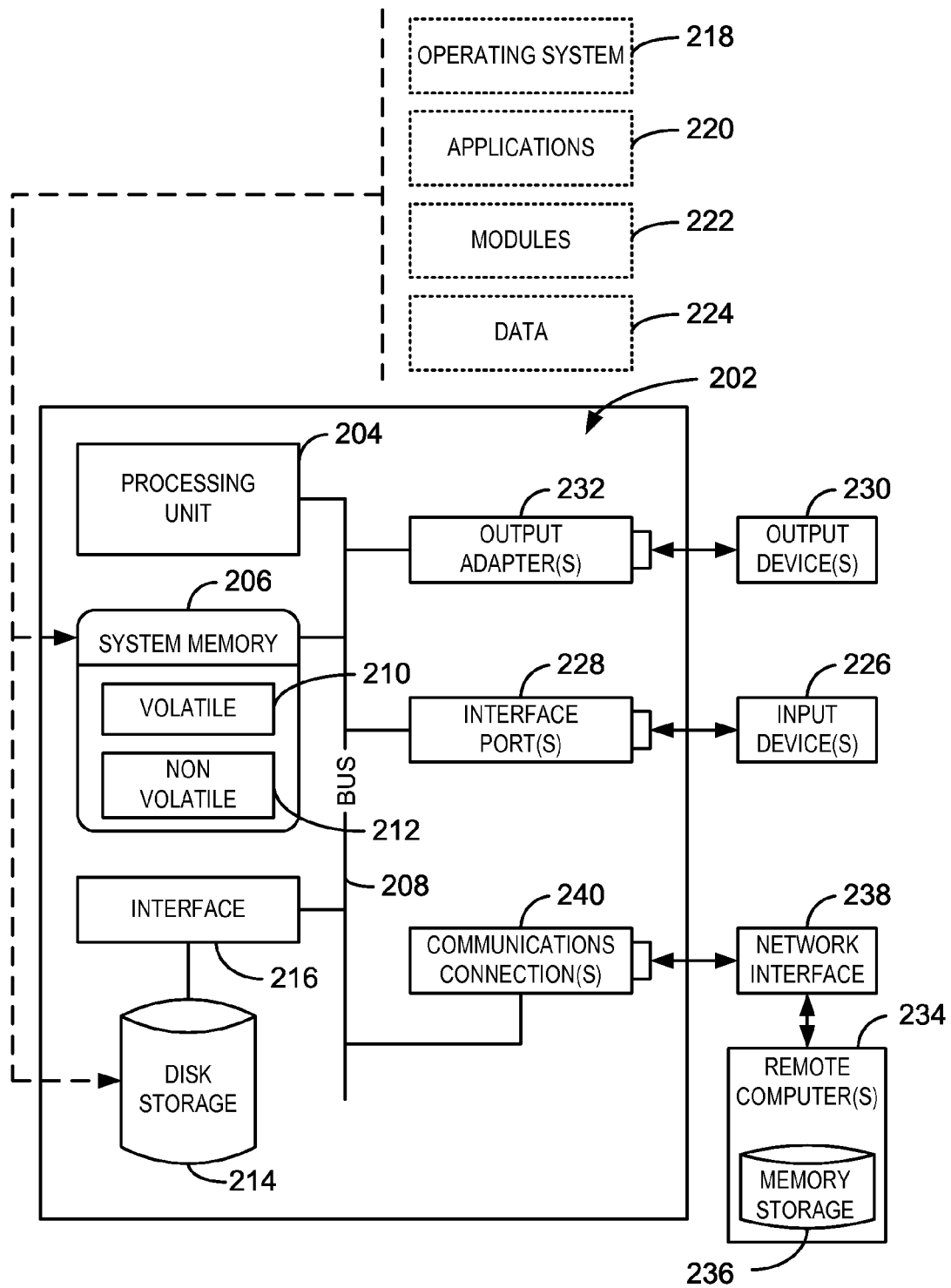
FIG. 2 is a block diagram of a computing environment that may be used to implement a system and method for Web search ranking.

In order to provide context for implementing various aspects of the claimed subject matter, FIGS. 1-2 and the following discussion are intended to provide a brief, general description of a computing environment in which the various aspects of the subject innovation may be implemented. For example, a method and system for Web search ranking can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for Web search ranking may be implemented. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment that may be used to implement a system and method for Web search ranking. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Figure 3:
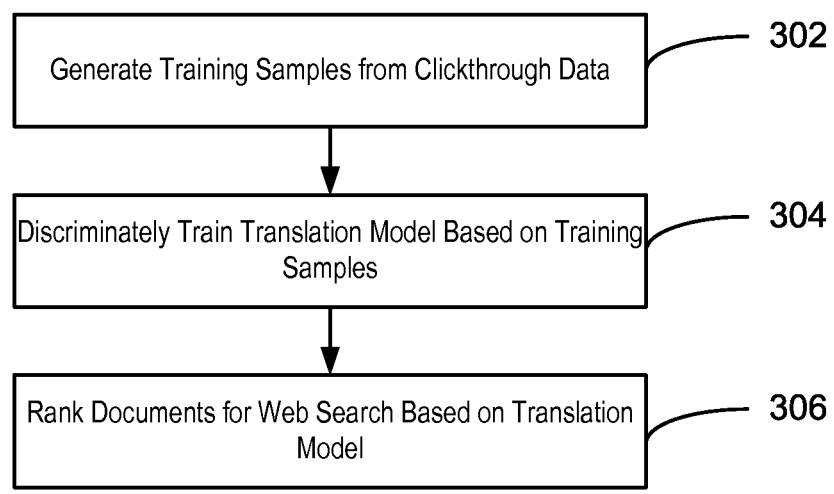
FIG. 3 is a generalized process flow diagram of a method for ranking documents for a Web search using a translation model.

FIG. 3 is a generalized process flow diagram of a method 300 for ranking documents for a Web search using a translation model. The method 300 begins at block 302, at which a number of training samples are generated from clickthrough data. The clickthrough data may include user queries, documents corresponding to the user queries, and user click information corresponding to the user queries. Such clickthrough data may be obtained from commercial search engine log files, for example. The training samples may include a number of features represented by positive query-document pairs and negative query-document pairs. The negative query-document pairs include query-document pairs that are retrieved by a search engine for a particular query and are rarely or never clicked on by users.

Each query-document pair may be generated based on a similarity between a document and a corresponding query. More specifically, each query-document pair may be generated based on a similarity between terms in a query and terms in a specified field of a document corresponding to the query. Such a specified field may include a title field, keywords field, or body content field of the document. For example, if the specified field is a title field of the document, query-title pairs may be generated.

The clickthrough data that are used to generate the training samples may include some amount of position bias. The term "position bias" refers to the likelihood of a user clicking on, or not clicking on, a particular document for a query based on the document's position in the search result list for the query. For example, a document that is consistently listed in a first page of the search result list has an advantage over a document that is listed in the second page of the search result list. Specifically, the document that is listed in the first page is more likely to be clicked on by the user, regardless of whether the document is more relevant to the query. Therefore, in various embodiments, position bias within the clickthrough data is removed during generation of the training samples. This may be accomplished by assigning a weight to each query-document pair based on a location of a corresponding document within a search result list for the query. For example, documents that are higher in the search result list may be assigned a lower weight.

At block 304, a translation model is discriminatively trained based on the generated training samples. The translation model may be a sparse log-linear translation model, as discussed further below. The translation model may be trained using an L1-norm regularization algorithm. For example, a specific type of L1-norm regularization algorithm referred to as the OWL-QN algorithm may be used to train the translation model, as discussed further below.

At block 306, a number of documents for a Web search are ranked based on the translation model. This may be accomplished by assigning a relevance score to each of the documents based on a relevance of the document to a corresponding query for the Web search. In addition, the documents may be reordered within the search result list for the Web search based on their relevance scores. For example, documents may be listed in descending order in the search result list according to their relevance scores.

The process flow diagram of FIG. 3 is not intended to indicate that the blocks of the method 300 are to be executed in any particular order, or that all of the blocks are to be included in every case. Further, any number of additional blocks not shown in FIG. 3 may be included within the method 300, depending on the details of the specific implementation.

As discussed above, the translation model is discriminatively trained. Such discriminative translation models differ from typical generative translation models in that, instead of calculating the joint probability for parameters, discriminative translation models predict the posterior probability directly. In other words, while generative translation models are used to model the probability distribution of P(Q|D), discriminative translation models are used to directly model P(relevance|Q,D). This difference between discriminative translation models and generative translation models also results in a difference in the manner in which clickthrough data is used to train each type of translation model. Specifically, only positive, i.e., relevant, query-document pairs are used to train generative translation models. However, both positive query-document pairs and negative, i.e., irrelevant, query-document pairs are used to generate discriminative translation models, as discussed further below.

One representative discriminative translation model is the logistic classifier, also known as MaxEnt classifier. Instead of designing a separate process to generate observations, the logistic classifier uses training samples to generate observations. This type of translation model has the exponential shown below in Eq. 1.

$$p^*(y|x) = \frac{\exp\left(\sum_i \lambda_i f_i(x, y)\right)}{Z(x)} \quad (1)$$

In Eq. 1, $Z(x)$ is the partition function for sample x, which is the summation of the potentials over all possible labels, as shown below in Eq. 2.

$$Z(x) = \Sigma_y \exp(\Sigma_i \lambda_i f_i(x,y)) \quad (2)$$

In a binary classification scenario, y can take on two values, namely, y={1, −1}. With some manipulation, the model form becomes as shown below in Eq. 3, which is the logistic classifier.

$$p(y|x) = \frac{1}{1 + \exp\left(-y\sum_i \lambda_i f_i(x)\right)} \quad (3)$$

Given training samples $\{(x_i, y_i), i=1 \ldots N\}$, a maximum log-likelihood estimation may be used to learn the model weights of a logistic classifier. In this case, the utility function for optimization is as shown below in Eq. 4.

$$\theta_* = \mathrm{argmax}_\theta \Sigma_i \log(p(y_i|x_i,\theta)) \quad (4)$$

In Eq. 4, the goal is to find a model parameter, θ, which is essentially a feature weight, λ, which gives the maximum likelihood on the training samples.

Regularization terms are often used in training discriminative translation models. Regularization terms may be used to prevent excessively large coefficient weights, which are usually caused by over fitting issues. L1-norm and L2-norm regularization terms are commonly used regularization terms. Using regularization terms, the utility function is modified as shown below in Eq. 5.

$$\theta_* = \mathrm{argmax}_\theta \Sigma_i \log(p(y_i|x_i,\theta)) + \lambda_1 \|w\| + \lambda_2 \|w\|^2 \quad (5)$$

In Eq. 5, regularization terms $\lambda_1\|w\|+\lambda_2\|w\|^2$ can be used as priors on the parameter space. The use of L1-norm regularization terms may prevent the model from over fitting, and may prune the weights for less contributing training samples to zero. Because the gradient of the L1-norm regularization term at any point has an absolute value pointing toward the origin, all training samples that are not contributing significantly would eventually be pruned with a weight equal to zero. For this reason, L1-norm regularization can be considered as a feature selection process integrated in the training process. However, L1-norm regularization makes the utility function no longer differentiable near the origin. Thus, special handling is performed in the numerical optimization steps. According to embodiments described herein, OWL-QN techniques are used to handle such numerical optimization steps. Such techniques are particularly useful for producing sparse translation models from very large datasets with very large corresponding feature spaces.

The OWL-QN algorithm that is utilized according to embodiments described herein is based on L-BFGS (limited-memory Broyden-Fletcher-Goldfarb-Shanno) for training large-scale log-linear models using L1-norm regularization. At each iteration, the OWL-QN algorithm computes a search direction by approximately minimizing a quadratic function that models the objective over an orthant containing the previous point. The OWL-QN algorithm can efficiently optimize the L1-norm regularized log-likelihood of log-linear models with billions of parameters.

Discriminative translation models may use a variety of different types of features generated from training data. Features that may be utilized according to embodiments described herein include unigram-pair features, bigram-pair features, and proximity term features. For unigram-pair features, the value is true if the word q exists in the query and the word d exists in the document. For bigram-pair features, the value is true if the bigram q1q2 exists in the query and the bigram d1d2 exists in the document. For proximity term features, the value is true if the word q1 and the word q2 appear together within a windows size of W in the query and the word d exists in the document.

The binary feature function may be coupled with a corresponding sample label. The sample label indicates whether a feature is a positive instance in which the query and the document are relevant, or a negative instance in which the query and the document are irrelevant. If a vocabulary size of V is assumed, $V^2*2$ feature functions for unigram-pair features, $V^4*2$ features for bigram-pair features, and $V^3*2$ features for proximity term features are obtained. This sums to a total $V^2*2+V^4*2+V^3*2$ features.

In various embodiments, clickthrough data for training the translation model is collected from a search engine log. The clickthrough data may include users' queries, resulting documents, and users' click information in the session. In some embodiments, the translation model is trained based on clickthrough data obtained from the search engine log spanning several months or even years.

In general, documents obtained for Web searches are semi-structured text documents that contain several different fields. For example, each document may include a title field, a keyword field, and a body content field, among others. Such fields may be referred to as "content fields." There may also be fields corresponding to text from other sources, which may be referred to as "popularity fields." Such popularity fields may include anchor text fields and query text fields. Popularity fields typically depend on the popularity of particular Web documents.

According to embodiments described herein, any of the fields described above may be used to generate features based on the clickthrough data. However, because features grow very fast with the length of the field, it may be difficult to use fields such as the body content field or the keyword field to generate the features. Thus, in various embodiments, title fields of the documents are used to generate the features from the clickthrough data.

In various embodiments, aggregation of the clickthrough data in the search engine log may be performed prior to model training in order reduce the amount of noise within the clickthrough data. For example, a search engine log may contain (Q, D, isClick, rank), in which Q is the user issued query, D is the document on the result page, isClick is a binary indicator, and rank is the position of result D in the search result list for query Q. In this case, the results may be aggregated by Q and D. After aggregation, an impression field, a click count field, a skip count field, and a miss count field are obtained. The impression field includes the number of times that Q, D appear. The click count field is the number of times that D was clicked in a query session with Q. The skip count field is the number of times D was marked skipped in a query session with Q. In general, a document may be considered to be marked skipped if the document is not clicked and is above the lowest ranking document that a user clicked in a query session. The miss count field is the number of times D was marked missed in a query session with Q. In general, a document may be considered to be marked missed if the document is below the lowest ranking clicked document in a query session.

In order to generate the features for training the translation model, the relevance of each query-document pair is determined. However, the documents' relevance to a query cannot be determined directly by the number of times or rate at which the document is clicked within the search result list for the query. Unfortunately, clicks within the clickthrough data are heavily distorted by many factors other than the actual relevance of the documents. The factor that results in the most distortion within the clickthrough data is the order in which the documents are presented in the search result list, since documents that are higher in the search result list are more likely to be clicked on by a user. This may be referred to as "click position bias," or simply "position bias."

A number of generative models have been developed for modeling the clicking behavior of users conditioned on the ranked search result list and the relevance of the document through latent variables. One such model is the examination model. The examination model assumes that the probability of a document being clicked on is conditioned on the document's relevance to a query as well as the document's rank within the search result list, as shown below in Eq. 6.

$$P(\text{click}|d_r,\text{rank})=r_d*x_{rank} \quad (6)$$

In Eq. 6, the term $x_{rank}$ is called a trust bias that represents a user's trust for the item appearing at a certain rank. The term $r_d$ is equal to $r_d \in [0,1]$. The term $x_{rank}$ is equal to $x_{rank} \in [0,1]$ and is a fixed discount function conditioned only on the rank. With a set of observations O={rank, click} for document D and query Q, the relevance $rel_d$ can be inferred using log likelihood as the loss function according to Eq. 7.

$$\text{Loss}=\Sigma_{d \in Click}\log(1-x_{r_d}rel_d)+\Sigma_{d \in NoClick}\log(x_{r_d}rel_d) \quad (7)$$

Thus, the optimum $rel_d$ value disregards all the position discount $x_{r_d}$ of the clicked document. In addition, the mean square loss may be as shown below in Eq. 8.

$$\text{Loss}=\Sigma_{d \in Click}(1-x_{r_d}rel_d)^2+\Sigma_{d \in NoClick}(x_{r_d}rel_d)^2 \quad (8)$$

A closed form solution on $rel_d$ may be determined according to Eqs. 9 and 10 in order to minimize the loss function.

$$\text{Loss}'=\Sigma_{d \in Click}-2*(1-x_{r_d}rel_d)*x_{r_d}+\Sigma_{d \in NoClick}2* (x_{r_d}rel_d)*x_{r_d}=0 \quad (9)$$

$$rel_d = \frac{\sum_{i \in Click} x_{r_i}^2}{\sum_{i \in Click} x_{r_i}^2 + \sum_{j \in NoClick} x_{r_j}^2} \quad (10)$$

Another model that has been developed for modeling the clicking behavior of users is the cascade model. According to the cascade model, it is assumed that a reader reads a document from top to bottom. It is also assumed that a user clicks on a document with a probability of $r_d$ and skips the document with a probability of $1-r_d$. Further, it is assumed that a user never comes back after one click on a document, and never stops until he clicks on each document. According to these assumptions, the probability of a user clicking on a document at rank i is given below in Eq. 11.

$$c_{d_i} = r_d \Pi_{j=1}^{i-1}(1 - r_{d\ in\ rank\ j}) \quad (11)$$

Following the above assumptions, each click in the click-through data only occurs when a user decides to click on a specific document, as well as skip every document above the specific document.

The dynamic Bayesian model may be considered as an extended version of the cascade model. In order to model the users' click behavior, the dynamic Bayesian model defines several hidden variables. Hidden variable E means that the user examined a particular URL. Hidden variable A means that the user was attracted by the URL. Hidden variable S means that the user was satisfied with the URL. A Bayesian network may then be built with the probability assumptions shown below in Eqs. 12-18.

$$A_i = 1, E_i \leftrightarrow 1 C_i = 1 \quad (12)$$

$$P(A_i = 1) = a_u \quad (13)$$

$$P(S_i = 1 | C_i = 1) = s_u \quad (14)$$

$$C_i = 0 \rightarrow S_i = 0 \quad (15)$$

$$S_i = 1 \rightarrow E_{i+1} = 0 \quad (16)$$

$$P(E_{i+1} = 1 | E_i = 1, S_i = 0) = \gamma \quad (17)$$

$$E_i = 0 \rightarrow E_{i+1} = 0 \quad (18)$$

The dynamic Bayesian model assumes that a URL is clicked if a user is attracted by it with a probability of $a_u$. A user can only be attracted by a URL if it is examined. The user will stop if he is satisfied by a clicked URL. However, a user can stop examining the next URL with a random probability of $1-\gamma$ without satisfaction. The relevance of a document is the probability of the user being satisfied after examining the document $P(S=1|E=1)$, as shown below in Eq. 19.

$$r_u := P(S_i = 1 | E_i = 1) = P(S_i = 1 | C_i = 1) P(C_i = 1 | E_i = 1) = a_u s_u \quad (19)$$

To inference the hidden variable from clicking observations, an expectation maximization algorithm may be used to find the maximum likelihood estimation of the clickthrough data.

If an assumption on the value of $\gamma=1$ is made, the inference process becomes much simpler. When $\gamma=1$, this means that a user never stops until a satisfactory document is found. Following this assumption, $\alpha_u$ and $s_u$ can be derived as shown below in Eqs. 20 and 21.

$$a_u = (a_u^N + \alpha_a)/(a_u^D + \alpha_a + \beta_a) \quad (20)$$

$$s_u = (s_u^N + \alpha_s)/(s_u^D + \alpha_s + \beta_s) \quad (21)$$

In Eqs. 20 and 21, the terms $\alpha$ and $\beta$ represent the prior beta distributions for $\alpha_u$ and $s_u$. The term $\alpha^N$ represents the document's click count. The term $\alpha^D$ represents the number of times the document D was examined, which is equal to the number of times it is above the last clicked URL in a session. The term $S^N$ represents the number of times document is a satisfactory document, that is, when it is the last clicked URL in a session. This simplified version of Bayesian Network has very good performance when $\gamma$ is not equal to 1.

In some embodiments, at least three different settings may be used to train the discriminative translation model. For the first setting, training samples with binary labels are used. For the second setting, training samples with binary labels are still used, but sample weights are also adjusted by the corresponding label confidence. For the third setting, a learning to rank approach is used.

A relevance binary labeling technique may be used to determine the relevance of each document-query pair. Specifically, the training samples set may be labeled using inferred relevance. First, all document-query pairs that have under 10 impressions are removed. The remaining document-query pairs are then ordered by their relevance.

Either hard cutting or soft cutting assignment techniques may be used to label the document-query pairs. For the hard cutting assignment technique, top and bottom document-query pairs from the ordered list are chosen as positive and negative instances. According to the defined ratio of training labels, a specified number, P, of most relevant document-query pairs are chosen as positive instances, and a specified number, N, of most irrelevant document-query pairs are chosen as negative instances. For the soft cutting assignment technique, instead of using only the most relevant and irrelevant document-query pairs, sample weights are used to interpolate between positive and negative instances. This may be accomplished using linear interpolation or a sigmoid function, for example.

In some embodiments, a heuristic relevance function is used to determine the relevance of query-document pairs. This may be accomplished by applying heuristic relevance functions on the aggregated statistics for relevance. In some cases, in order to quickly find suitable heuristic relevance functions, human judgment labels are used as the ground truth for relevance.

A simple linear function is trained using statistics from aggregating the training samples identified from the click-through data as features. In order to find good weights for the features, an intersection set between the clickthrough data set and the human judgment data set may be found. A grid search may then be performed to find the optimal weight of the function. For each point in the search, a Normalized Discounted Cumulative Gain (NDCG) score may be calculated using the weights at the current step. The point with the maximum NDCG score is then used as the optimal weight combination.

The NDCG evaluation metric used according to embodiments described herein places more importance on accurately ranking items are higher ranks, while discounting items at lower ranks. The DCG score may be calculated as shown below in Eq. 22, wherein $rel_i$ is a predetermined gain for each document label.

$$DCG_p = rel_1 + \sum_{i=2}^{p} \frac{rel_i}{\log_2(i+1)} \quad (22)$$

However, the DCG scores of ranked lists of different lengths and different label distributions may vary significantly. Thus, the normalized DCG may be calculated by dividing by a DCG score of perfect ranking, i.e., a document ordered by its reference gains. This may guarantee that the DCG score will be between 0 and 1.

In some embodiments, the discriminative translation model is trained according to a pairwise training technique. The pairwise training technique also uses a binary classifier to approximate a learning to rank problem. However, instead of generating a label for each individual training sample, a pair of samples is used as an input. Furthermore, instead of learning a feature weight for a single point, the features differences between positive and negative query-document pairs are learned.

A clickthrough data set may be aggregated by the corresponding queries. Within each list, documents may be ordered by their inferred relevance. Pairs of samples in which one pair's relevance is significantly higher than the other pair's relevance may be found. Two-sample t-tests with unequal sample sizes and unequal variances may be used. For each pair (x1,x2), two instances are generated, including {x=x2−x1, y=−1}} and {x=x1−x2, y=−1}. These instances are then are used to train a logistic classifier. The resulting classifier can be used to work directly on the feature for a point sample, and its resulting posterior probabilities for labels are used for ranking.

Figure 4:
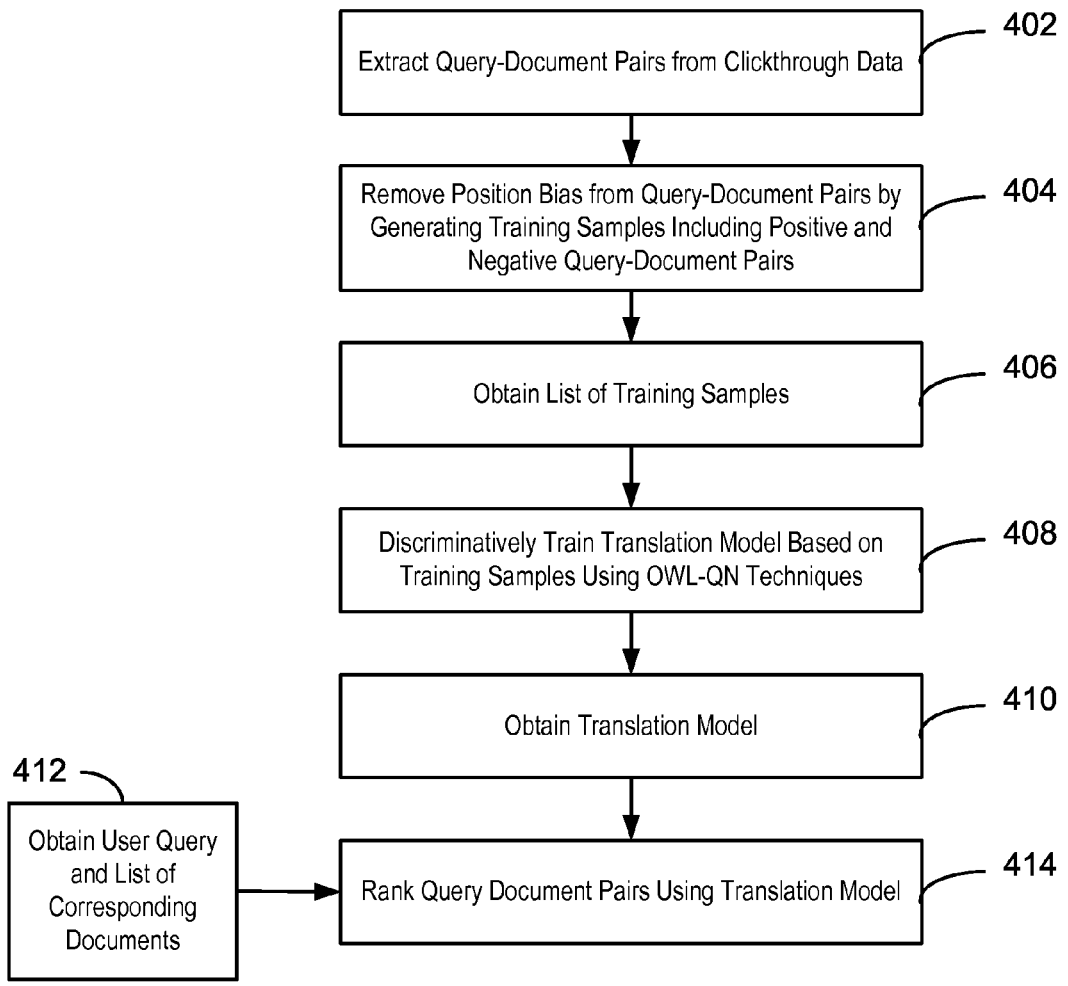
FIG. 4 is a process flow diagram of a method for training a translation model and performing Web search ranking using the trained translation model.

FIG. 4 is a process flow diagram of a method 400 for training a translation model and performing Web search ranking using the trained translation model. The method begins at block 402, at which query-document pairs are extracted from clickthrough data. The clickthrough data may be obtained from a search engine log, and may include clickthrough data collected over several days, months, or years. At block 404, position bias is removed from the query-document pairs by generating training samples including positive and negative query-document pairs. Each positive and negative query-document pair may be assigned a weight that is determined at least in part based on its position in a search result list for a corresponding query. For example, documents listed higher in the search result list are assigned a lower weight.

At block 402, a list of all training samples is obtained. At block 408, the translation model is trained based on the training samples using OWL-QN techniques. The trained translation model is then obtained at block 410. In various embodiments, the translation model is a sparse log-linear model.

At block 412, a user query and a list of corresponding documents are obtained. The user query and the corresponding documents may be obtained in the form of a number of query-document pairs. At block 414, the query-document pairs are ranked based on their relevance to the user query using the trained translation model. Further, in some embodiments, the documents are ordered in descending order according to their relevance to the user query within a search result list that is displayed to the user. Thus, the method 400 may provide for more efficient Web searching by allowing the user to more readily obtain a document that is relevant to the user query.

The process flow diagram of FIG. 4 is not intended to indicate that the blocks of the method 400 are to be executed in any particular order, or that all of the blocks are to be included in every case. Further, any number of additional blocks not shown in FIG. 4 may be included within the method 400, depending on the details of the specific implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for Web search ranking, comprising:
generating a plurality of training samples from clickthrough data, wherein the plurality of training samples comprises positive query-document pairs and negative query-document pairs, and wherein position bias from the clickthrough data is removed during generation of the plurality of training samples;
discriminatively training a translation model based on the plurality of training samples; and
ranking a plurality of documents for a Web search based on the translation model.

2. A system for Web search ranking, comprising:
a processor that is adapted to execute stored instructions; and
a system memory, wherein the system memory comprises code configured to:
generate a plurality of training samples from clickthrough data, wherein position bias within the clickthrough data is removed during generation of the plurality of training samples;
discriminatively train a sparse log-linear translation model based on the plurality of training samples; and
rank a plurality of documents for a Web search based on the sparse log-linear translation model.

3. The system of claim 2, wherein ranking the plurality of documents for the Web search comprises assigning a relevance score to each of the plurality of documents based on a relevance of the document to a query.

4. The system of claim 2, wherein the plurality of training samples comprises positive query-document pairs and negative query-document pairs.

5. The system of claim 4, wherein each of the positive query-document pairs and each of the negative query-document pairs is generated based on a similarity between terms in a query and terms in a specified field of a document corresponding to the query.

6. The system of claim 5, wherein the specified field comprises a title field of the document.

7. The system of claim 2, wherein the clickthrough data comprise user queries, documents corresponding to the user queries, and user click information corresponding to the user queries.

8. The system of claim 2, wherein the sparse log-linear translation model is discriminatively trained using an L1-norm regularization technique.

9. The system of claim 8, wherein the L1-norm regularization technique comprises an Orthant-Wise Limited-memory Quasi-Newton (OWL-QN) technique.

10. The system of claim 2, wherein removing the position bias comprises assigning a weight to each query-document pair based on a location of a corresponding document within a search result list of a corresponding query, and wherein documents that are higher in the search result list are assigned a lower weight.

11. One or more computer-readable storage media for storing computer-readable instructions, the computer-readable instructions providing a Web search ranking system when executed by one or more processing devices, the computer-readable instructions comprising code configured to:
generate a plurality of training samples from clickthrough data, wherein the plurality of training samples comprises positive query-document pairs and negative query-document pairs, and wherein position bias within the clickthrough data is removed during generation of the plurality of training samples;
discriminatively train a translation model based on the plurality of training samples; and
rank a plurality of documents for a Web search based on the translation model.

12. The one or more computer-readable storage media of claim 11, wherein ranking the plurality of documents for the Web search comprises assigning a relevance score to each of the plurality of documents based on a relevance of the document to a query.

13. The one or more computer-readable storage media of claim 11, wherein the translation model is discriminatively trained using an L1-norm regularization technique.

14. The one or more computer-readable storage media of claim 13, wherein the L1-norm regularization technique comprises an Orthant-Wise Limited-memory Quasi-Newton (OWL-QN) technique.

\* \* \* \* \*